United States Patent
Barsness et al.

(10) Patent No.: US 8,812,818 B2
(45) Date of Patent: *Aug. 19, 2014

(54) MANAGEMENT OF PERSISTENT MEMORY IN A MULTI-NODE COMPUTER SYSTEM

(75) Inventors: Eric Lawrence Barsness, Pine Island, MN (US); David L. Darrington, Rochester, MN (US); Patrick Joseph McCarthy, Rochester, MN (US); Amanda Peters, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 166 days.

This patent is subject to a terminal disclaimer.

(21) Appl. No.: 13/372,609

(22) Filed: Feb. 14, 2012

(65) Prior Publication Data

US 2012/0144132 A1 Jun. 7, 2012

Related U.S. Application Data

(62) Division of application No. 11/926,799, filed on Oct. 29, 2007, now Pat. No. 8,458,433.

(51) Int. Cl.
*G06F 13/00* (2006.01)
*G06F 9/26* (2006.01)

(52) U.S. Cl.
USPC ............ 711/203; 711/100; 711/118; 711/202

(58) Field of Classification Search
CPC ..... G06F 12/00; G06F 12/02; G06F 12/0246; G06F 12/04; G06F 12/06; G06F 12/0842; G06F 12/0888; G06F 12/0871; G06F 12/0891; G06F 17/30224
USPC ......... 711/100–104, 118, 133, 134, 142–143, 711/200–203
See application file for complete search history.

(56) References Cited

U.S. PATENT DOCUMENTS

| | | | |
|---|---|---|---|
| 6,298,428 B1 | 10/2001 | Munroe et al. | |
| 6,766,434 B2 | 7/2004 | Gaertner et al. | |
| 7,380,039 B2* | 5/2008 | Miloushev et al. | 710/244 |
| 8,458,433 B2* | 6/2013 | Barsness et al. | 711/203 |
| 2002/0073082 A1 | 6/2002 | Duvillier et al. | |
| 2002/0161911 A1* | 10/2002 | Pinckney et al. | 709/231 |
| 2005/0216552 A1 | 9/2005 | Fineberg et al. | |
| 2006/0156074 A1 | 7/2006 | Kumar | |
| 2008/0005529 A1 | 1/2008 | Morris | |
| 2008/0083030 A1 | 4/2008 | Durham et al. | |
| 2008/0320459 A1* | 12/2008 | Morris | 717/162 |
| 2009/0055594 A1 | 2/2009 | Berg et al. | |
| 2009/0327625 A1 | 12/2009 | Jaquette et al. | |

* cited by examiner

*Primary Examiner* — Tuan Thai
*Assistant Examiner* — Zhuo Li
(74) *Attorney, Agent, or Firm* — Martin & Associates LLC; Bret J. Petersen

(57) ABSTRACT

A method and apparatus creates and manages persistent memory (PM) in a multi-node computing system. A PM Manager in the service node creates and manages pools of nodes with various sizes of PM. A node manager uses the pools of nodes to load applications to the nodes according to the size of the available PM. The PM Manager can dynamically adjust the size of the PM according to the needs of the applications based on historical use or as determined by a system administrator. The PM Manager works with an operating system kernel on the nodes to provide persistent memory for application data and system metadata. The PM Manager uses the persistent memory to load applications to preserve data from one application to the next. Also, the data preserved in persistent memory may be system metadata such as file system data that will be available to subsequent applications.

10 Claims, 6 Drawing Sheets

MANAGEMENT OF PERSISTENT MEMORY IN A MULTI-NODE COMPUTER SYSTEM

CROSS-REFERENCE TO PARENT APPLICATION

This patent application is a divisional of U.S. Ser. No. 11/926,799 filed on Oct. 29, 2007, which is incorporated herein by reference.

BACKGROUND

1. Technical Field

The disclosure and claims herein generally relate to multi-node computer systems, and more specifically relate to managing persistent memory in a multi-node computer system such as in the memory of a massively parallel super computer.

2. Background Art

Supercomputers and other multi-node computer systems continue to be developed to tackle sophisticated computing jobs. One type of multi-node computer system is a massively parallel computer system. A family of such massively parallel computers is being developed by International Business Machines Corporation (IBM) under the name Blue Gene. The Blue Gene/L system is a high density, scalable system in which the current maximum number of compute nodes is 65,536. The Blue Gene/L node consists of a single ASIC (application specific integrated circuit) with 2 CPUs and memory. The full computer is housed in 64 racks or cabinets with 32 node boards in each rack.

Computer systems such as Blue Gene have a large number of nodes, each with its own processor and local memory. The local memory is allocated by a translation look-aside buffer (TLB) that provides virtual to physical address translation. The TLB contains a number of pointers to memory segments, where the segments may be 1 m (megabyte), 16 m, 256 m etc. In the typical prior art system, when an application is installed, the TLB and all the local memory are cleared for the new application.

A multi-node computer system is often called upon to perform complex computing tasks on data stored in the node's local memory. Data for an application is typically loaded from a bulk storage unit such as a hard disk drive. The data created by a first application may be needed by a second application, or the same file system data may be used by subsequent applications. When the first application is complete, the data is typically saved to a data storage device, and then the data is re-loaded after the second application is loaded on the node. In a parallel computer system re-loading data for all the nodes for each new application requires a significant portion of computer system resources.

Without a way to effectively create and manage persistent memory, parallel computer systems will continue to suffer from reduced efficiency of computer system.

BRIEF SUMMARY

An apparatus and method is described for creating and managing persistent memory (PM) in a multi-node computing system. A PM Manager in the service node creates and manages pools of nodes with various sizes of PM. A node manager uses the pools of nodes to load applications to the nodes according to the size of the available PM. The PM Manager can dynamically adjust the size of the PM according to the needs of the applications based on historical use or as determined by a system administrator.

The PM Manager works in conjunction with an operating system kernel on the nodes to provide persistent memory for application data and system metadata. The PM Manager uses the persistent memory to load applications in such a way as to preserve data from one application to the next. This operation includes re-establishing the TLB pointers to the persistent memory after the node is re-initialized for a new application. The data created by a first application is then available for use by the second application. Alternatively, the data preserved in persistent memory may be system metadata such as file system data that will be available to subsequent applications such that the system metadata will not need to be reloaded for each new application running on the node.

The description and examples herein are directed to a massively parallel computer system such as the Blue Gene architecture, but the claims herein expressly extend to other parallel computer systems with multiple processors arranged in a network structure.

The foregoing and other features and advantages will be apparent from the following more particular description, and as illustrated in the accompanying drawings.

BRIEF DESCRIPTION OF DRAWINGS

The disclosure will be described in conjunction with the appended drawings, where like designations denote like elements, and.

DETAILED DESCRIPTION

The description and claims herein are directed to a method and apparatus for creating and managing persistent memory (PM) in a multi-node computing system. The examples herein will be described with respect to the Blue Gene/L massively parallel computer developed by International Business Machines Corporation (IBM). A PM Manager in the service node creates and manages pools of nodes with various sizes of PM. A node manager uses the pools of nodes to load applications to the nodes according to the size of the available PM. The PM Manager works in conjunction with an operating system kernel on the nodes to provide persistent memory for application data and system metadata. The PM Manager uses the persistent memory to load applications in such a way as to preserve data from one application to the next. Also, the data preserved in persistent memory may be system metadata such as file system data that will be available to subsequent applications.

Figure 1:
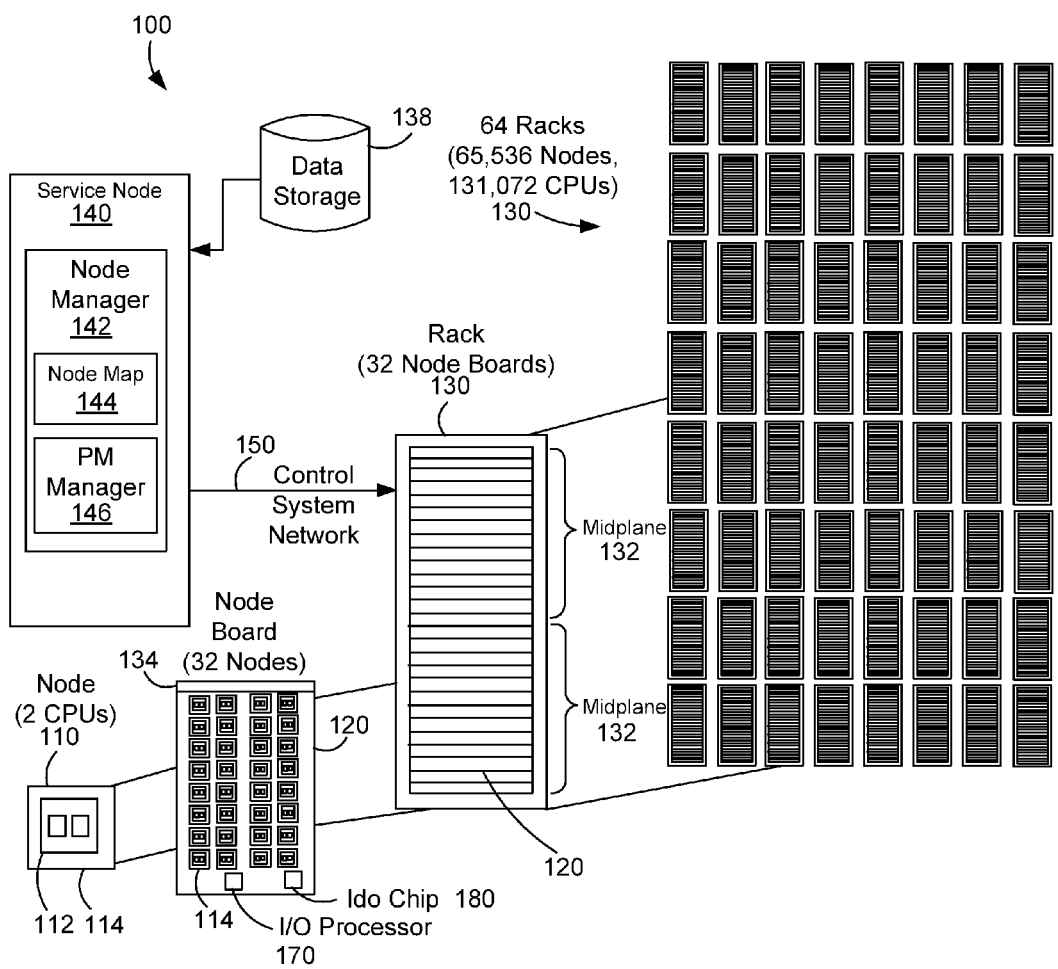
FIG. 1 is a block diagram of a massively parallel computer system.

FIG. 1 shows a block diagram that represents a massively parallel computer system 100 such as the Blue Gene/L computer system. The Blue Gene/L system is a scalable system in which the maximum number of compute nodes is 65,536.

Each node 110 has an application specific integrated circuit (ASIC) 112, also called a Blue Gene/L compute chip 112. The compute chip incorporates two processors or central processor units (CPUs) and is mounted on a node daughter card 114. The node also typically has 512 megabytes of local memory (not shown). A node board 120 accommodates 32 node daughter cards 114 each having a node 110. Thus, each node board has 32 nodes, with 2 processors for each node, and the associated memory for each processor. A rack 130 is a housing that contains 32 node boards 120. Each of the node boards 120 connect into a midplane printed circuit board 132 with a midplane connector 134. The midplane 132 is inside the rack and not shown in FIG. 1. The full Blue Gene/L computer system would be housed in 64 racks 130 or cabinets with 32 node boards 120 in each. The full system would then have 65,536 nodes and 131,072 CPUs (64 racks×32 node boards× 32 nodes×2 CPUs).

The Blue Gene/L computer system structure can be described as a compute node core with an I/O node surface, where communication to 1024 compute nodes 110 is handled by each I/O node that has an I/O processor 170 connected to the service node 140. The I/O nodes have no local storage. The I/O nodes are connected to the compute nodes through the logical tree network and also have functional wide area network capabilities through a gigabit ethernet network (not shown). The gigabit Ethernet network is connected to an I/O processor (or Blue Gene/L link chip) 170 located on a node board 120 that handles communication from the service node 160 to a number of nodes. The Blue Gene/L system has one or more I/O processors 170 on an I/O board (not shown) connected to the node board 120. The I/O processors can be configured to communicate with 8, 32 or 64 nodes. The service node is uses the gigabit network to control connectivity by communicating to link cards on the compute nodes. The connections to the I/O nodes are similar to the connections to the compute node except the I/O nodes are not connected to the torus network.

Again referring to FIG. 1, the computer system 100 includes a service node 140 that handles the loading of the nodes with software and controls the operation of the whole system. The service node 140 is typically a mini computer system such as an IBM pSeries server running Linux with a control console (not shown). The service node 140 is connected to the racks 130 of compute nodes 110 with a control system network 150. The control system network provides control, test, and bring-up infrastructure for the Blue Gene/L system. The control system network 150 includes various network interfaces that provide the necessary communication for the massively parallel computer system. The network interfaces are described further below.

The service node 140 communicates through the control system network 150 dedicated to system management. The control system network 150 includes a private 100-Mb/s Ethernet connected to an Ido chip 180 located on a node board 120 that handles communication from the service node 160 to a number of nodes. This network is sometime referred to as the JTAG network since it communicates using the JTAG protocol. All control, test, and bring-up of the compute nodes 110 on the node board 120 is governed through the JTAG port communicating with the service node.

Figure 2:
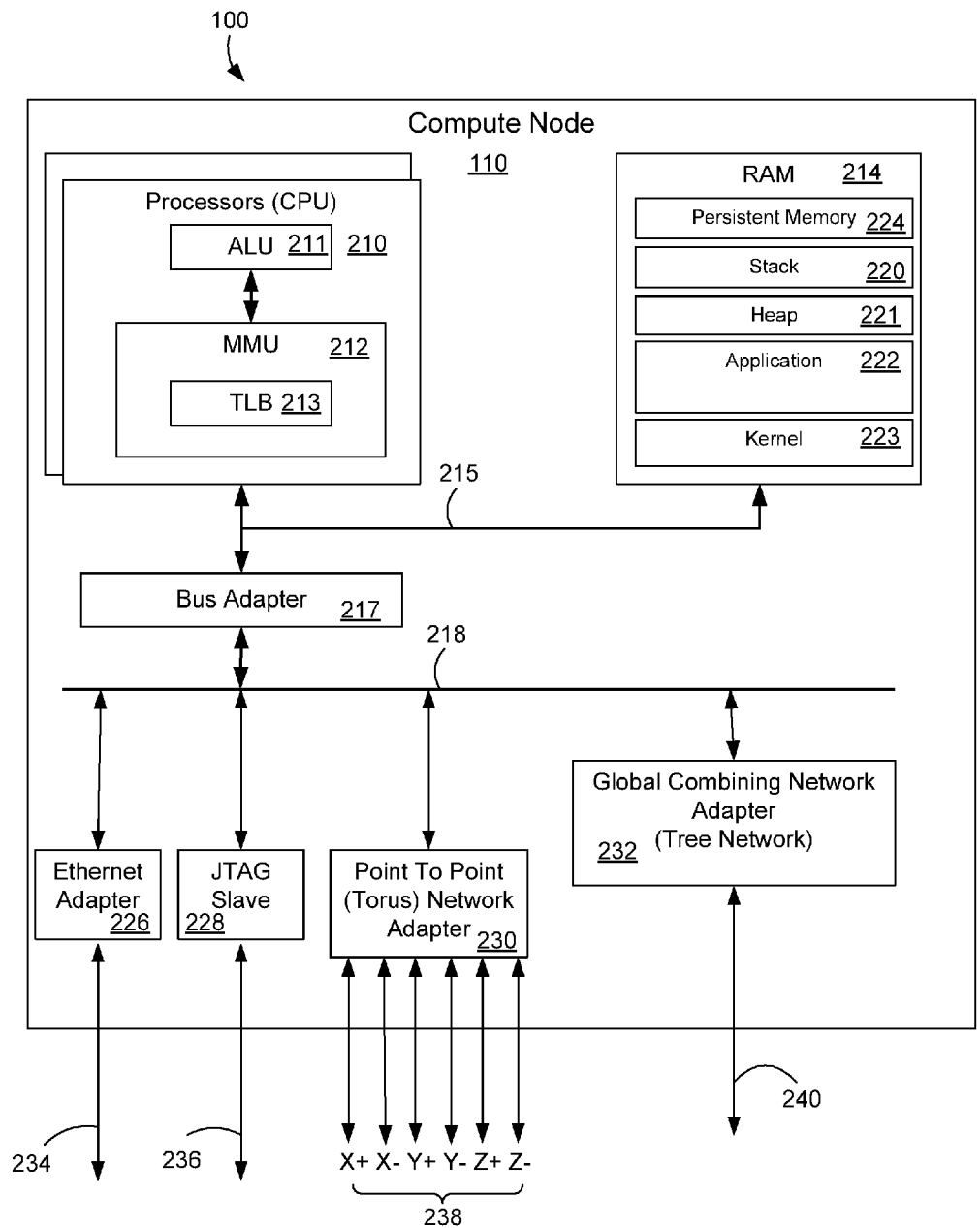
FIG. 2 is a block diagram of a compute node in a massively parallel computer system.

The Blue Gene/L supercomputer communicates over several communication networks. FIG. 2 is a block diagram that shows the I/O connections of a compute node 110 on the Blue Gene/L computer system. The 65,536 computational nodes and 1024 I/O processors 170 are arranged into both a logical tree network and a logical 3-dimensional torus network. The torus network logically connects the compute nodes in a lattice like structure that allows each compute node 110 to communicate with its closest 6 neighbors. In FIG. 2, the torus network is illustrated by the X+, X−, Y+, Y−, Z+ and Z− network connections that connect the node to six respective adjacent nodes. Other communication networks connected to the node include a JTAG network and a the global interrupt network. The JTAG network provides communication for testing and control from the service node 140 over the control system network 150 shown in FIG. 1. The global interrupt network is used to implement software barriers for synchronization of similar processes on the compute nodes to move to a different phase of processing upon completion of some task. Further, there are clock and power signals to each compute node 110.

The service node includes a node manager 142 for managing the compute nodes, a node map 144, and a PM Manager 146. The node manager includes historical information about activity of the nodes and networks. The node map 144 is a list or data file that indicates a correspondence between nodes and applications and data loaded into those nodes. The node map is an optimal mapping of where to place applications and data structures in the nodes as described further below. The node map could be a simple list, index or other data structure. The PM manager 146 comprises software in the service node 140 that operates to manage persistent memory in the nodes in accordance with the node map 148 as described further below. The invention described herein may be embodied as an article of manufacture comprising software stored on a non-transitory computer recordable medium such as a CD-ROM.

FIG. 2 illustrates a block diagram of an exemplary compute node as introduced above. The compute node 110 of FIG. 2 includes a plurality of computer processors 210, each with an arithmetic logic unit (ALU) 211 and a memory management unit (MMU) 212. The MMU includes a translation look-aside buffer (TLB) 213 described further below. Processors 210 are connected to random access memory ('RAM') 214 through a high-speed memory bus 215. Also connected to the high-speed memory bus 214 is a bus adapter 217. The bus adapter 217 connects to an extension bus 218 that connects to other components of the compute node.

Stored in RAM 214 is a stack 220, a heap 221, an application program 222, an operating system kernel 223 and persistent memory 224. The persistent memory 224 is managed by the PM Manager 146 shown in FIG. 1 and is discussed further below. The stack and heap contain data created during the execution of the application program 222. The application program is loaded on the node by the control system to perform a user designated task. The application program typically runs in a parallel with application programs running on adjacent nodes. The operating system kernel 223 is a module of computer program instructions and routines for an application program's access to other resources of the compute node. The quantity and complexity of tasks to be performed by an operating system on a compute node in a parallel computer are typically smaller and less complex than those of an operating system on a typical stand alone computer. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX, Linux, Microsoft XP, AIX, IBM's i5/OS, and others as will occur to those of skill in the art.

The compute node 110 of FIG. 2 includes several communications adapters 226, 228, 230, 232 for implementing data communications with other nodes of a parallel computer.

Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network.

The data communications adapters in the example of FIG. 2 include a Gigabit Ethernet adapter 226 that couples example compute node 110 for data communications to a Gigabit Ethernet 234. Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit 228 that couples the compute node 110 for data communications to a JTAG Master circuit over a JTAG network 236. JTAG is the usual name used for the IEEE 1149.1 standard entitled Standard Test Access Port and Boundary-Scan Architecture for test access ports used for testing printed circuit boards using boundary scan. JTAG boundary scans through JTAG Slave 236 may efficiently configure processor registers and memory in compute node 110.

The data communications adapters in the example of FIG. 2 include a Point To Point Network Adapter 230 that couples the compute node 110 for data communications to a network 238. In Blue Gene, the Point To Point Network is typically configured as a three-dimensional torus or mesh. Point To Point Adapter 230 provides data communications in six directions on three communications axes, x, y, and z, through six bidirectional links 238: +x, -x, +y, -y, +z, and -z.

The data communications adapters in the example of FIG. 2 include a Global Combining Network Adapter 232 that couples the compute node 110 for data communications to a network 240 configured as a binary tree. Global Combining Network Adapter 232 provides data communications through three bidirectional links: two links to children nodes and one link to a parent node (not shown). The Global Combining Network Adapter 232 of each node has additional hardware to support operations on the global combining network.

Massively parallel computers have a specific amount of memory available to each node. In the Blue Gene super computer this is 1 GB. This memory is used for the heap, stack, application and operating system kernel as described above. Typically, the ending of a job stream will cause the memory of a node to be reset. Hence, nothing in memory persists from application execution to the next, which in some cases is undesirable. The PM Manager described herein provides a mechanism so that some part of the memory remains "static". This static portion of memory is not re-initialized upon the ending of a job or application. The PM Manager introduced above provides configuration and management of this persistent memory. The PM Manager also dynamically allocates amounts of persistent memory as needed by an application. Dynamic allocation insures that there is no wasted memory, meaning where more memory than is needed by the application is allocated as static or persistent. For example, where two jobs that run sequentially, Job1 may need 16 MB of static storage and Job2 may only need 1 MB. Without a way to change the configuration of statically mapped memory, Job2 will also run with 16 MB of static memory. This leaves 15 MB that Job2 can't use, but could otherwise have been used as normal heap space.

Compute nodes in the Blue Gene computer system are based on the widely popular PowerPC (PPC) architecture by International Business Machines Corporation (IBM). PPC uses a Translation Look-aside Buffer (TLB) to speed-up virtual to physical address translation. The TLB has a fixed number of entries that describe virtual address to physical address mapping. Blue Gene was designed with a static TLB mapping so that all of physical memory is mapped with the TLB.

Figure 3:
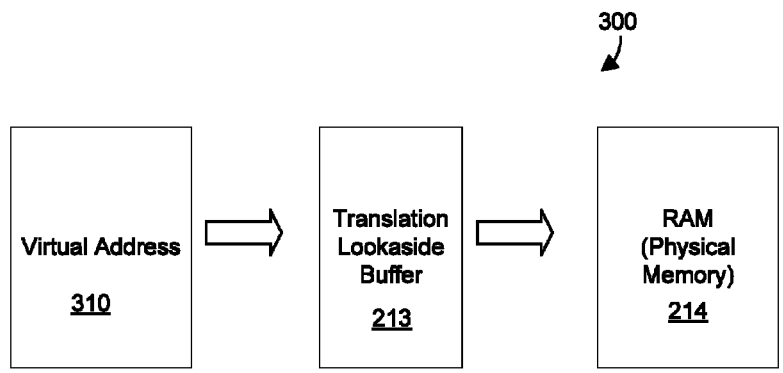
FIG. 3 is a block diagram to illustrate address translation in the compute node illustrated in FIG. 2 with a translation look-aside buffer (TLB)
Figure 4:
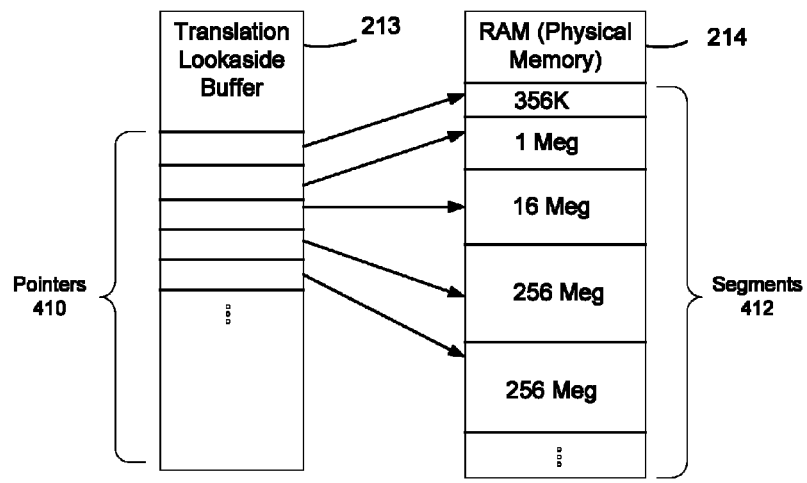
FIG. 4 shows a block diagram of a TLB with pointers to physical memory.

FIG. 3 illustrates the general concept of address translation using a TLB. A virtual address 310 used by a software application is presented to the TLB 312 to determine an actual physical address in physical memory 314. This concept of virtual to physical address translation is commonly known in the computer art. FIG. 4 further illustrates address translation in the TLB. FIG. 4 illustrates the pointers 410 in the TLB 213. Each pointer 410 points to a segment 412 of physical memory 214. The segments 412 may vary from 1 megabyte to 256 megabyte. There may several pointers in the TLB for each size of segment.

Figure 5:
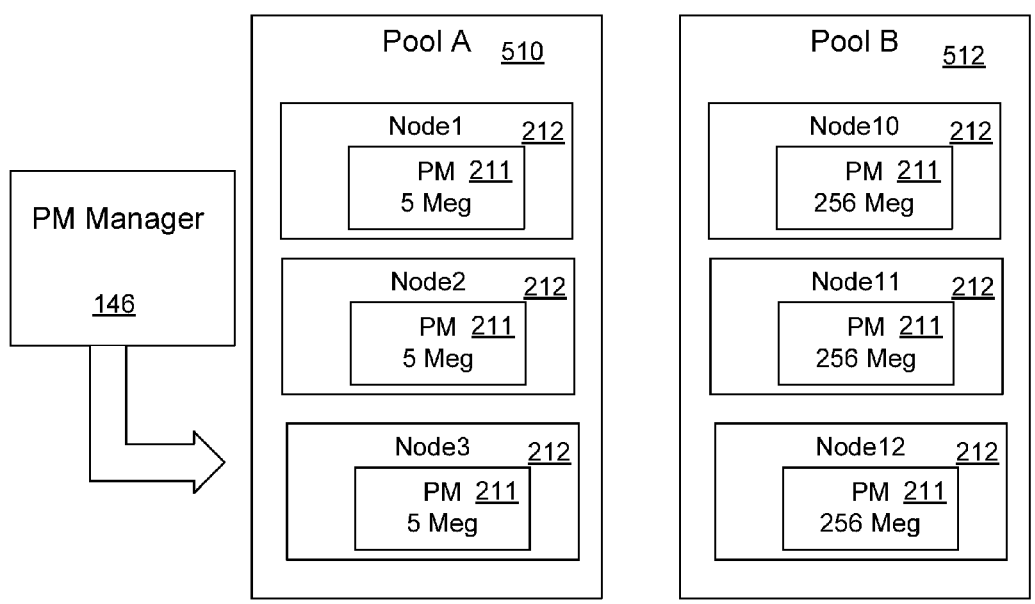
FIG. 5 represents the PM Manager making node pools having different sizes of persistent memory.

The PM Manager allows a user to allocate a number of nodes with persistent memory (224 in FIG. 2) of different sizes. The nodes may be allocated into different pools, where each pool has nodes consisting of the same amount of persistent storage. This provides an easy way to determine how many free nodes of different types exist and also provides efficient utilization of the nodes by allowing different jobs to be set up in the different node pools. FIG. 5 illustrates the PM Manager 146 allocating two pools 510, 512 of compute nodes 212 with different amounts of persistent memory 211. In this example, the PM Manager has allocated Pool A 510 to have nodes with 5 megabytes of persistent memory on each node. Further, the PM Manager has allocated a second pool of nodes, Pool B 512 each have 256 megabytes of persistent memory. The pools shown in FIG. 5 are for illustration purposes only. Actual node pools may contain many more nodes and the pools may consist of a different number of nodes. The PM Manager provides automatic management of the node pools but would also allow user definition and preliminary assignment of the node pools.

Applications may be monitored by the PM Manager to determine their actual needs so that an application can be efficiently placed in a pool of nodes. For example, the user or the PM Manager may choose to run an application on a node with 256 M of persistent memory. The PM Manager will then monitor and track the application and its use of static storage using the JTAG network to determine how much persistent memory is really needed. Over time, the PM Manager can create a memory profile for the application with the appropriate amount of persistent storage. This information that this application should run on a node with X amount of static storage can be used by the PM Manager and/or reported to the system user or administrator. We also can monitor applications to see if their use of persistent storage changes over time, such that it should be "migrated" to another node pool that has more or less persistent storage. Provisions can also be made for applications that attempt to run on a node with not enough persistent storage to be moved to a more appropriate node.

The PM Manager can perform additional tasks to manage the persistent memory to ensure efficient usage of the space. For example, the PM Manager may track persistent storage usage by an application ID for future reference to allocate persistent memory for the application. The PM Manager can migrate processes when needed such as when an application ID needs more storage or when an application is not using enough of the persistent storage. The PM Manager can allow the user to define a pool set for a given job. The PM Manager could also determine how effectively jobs run with less heap space to determine the correct amount of persistent storage.

Further, the PM Manager could incorporate data compression. The PM Manager would then analyze what is being stored in the persistent area and determine if the values being stored would be compressible to the point where the time to do the compression or decompression would be lower than the time to wait for IO to occur. Similarly the persistent storage could be treated as a database whereby the memory would be scanned for contiguous chunks of memory that have the same values. By doing this we could represent the larger string with a key value and only store the larger string once. Statistics would kept to ensure that data being stored is being accessed. Any area of persistent store that is not being used would be fully compressed. Data that is rarely accessed from persistent storage could in some situations be persisted out to disk in order to free up more persistent memory for data that is used more frequently. This could be done temporarily until the application is moved to a node with more static storage available. This would be done "under the covers" so the application wouldn't realize the data is stored remotely.

Figure 6:
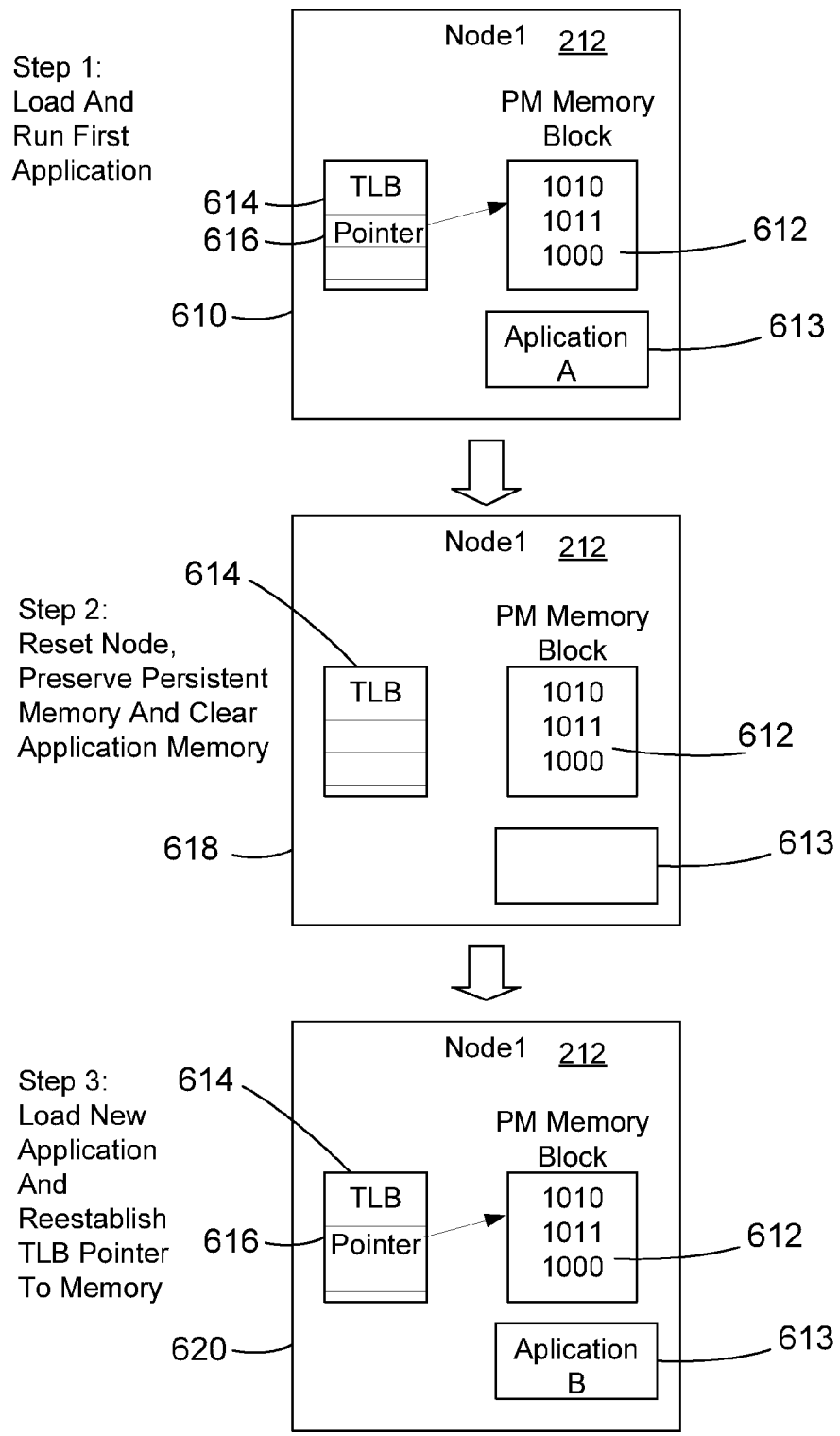
FIG. 6 illustrates the PM Manager assisting in the loading of applications on a node to create persistent memory from a first application to a subsequent application.

FIG. 6 illustrates an example of using persistent memory in a parallel computer system such as the Blue Gene computer system. In the first block 610, Node1 212 is shown with a persistent memory data segment 612 that is used by Application A 613 stored in an application program area of memory. A TLB 614 with a pointer 616 points to the PM block 612. At the completion of the Application A, the node is reset to prepare the node for the next application. When this is done, the data segment 612 in the persistent memory is preserved as shown in second block 618. Resetting the node typically also resets the TLB 614 as shown. A second application program (Application B) 613 is loaded into the same node 212 as shown in the third block 620 of Node 1. The PM Manager then re-establishes the TLB pointer 616 to point to the data segment 612 in the persistent memory so the data available to or changed by the first application program can be reused without having to be reloaded.

Again referring to FIG. 6, the PM Manager loads the data segment 612 with different types of data to be used in different ways. For example, the data segment 612 may be loaded with data that is then modified by Application A. The data is then maintained in persistent memory as described above and then used by Application B. In this scenario, the PM Manager manages the persistent memory for tightly coupled or related applications so that data does not have to be stored and retrieved from bulk memory. The PM Manager loads the data and manages the persistent memory in the basic manner shown in FIG. 6 to provide data continuity between applications loaded sequentially in the nodes of the parallel computer system.

In another scenario, the PM Manager manages persistent memory for more loosely coupled or less related applications. In this scenario, the PM Manager loads system metadata such as file system data into the persistent memory to provide a type of file system cache in the persistent memory. The PM Manager manages the persistent memory in the basic manner shown in FIG. 6 to provide the stored system metadata to applications loaded sequentially in the nodes of the parallel computer system. In this scenario, the subsequent applications may or may not need the exact system data, but if it is stored in the system data cache in persistent memory then it will reduce the access to system data stored in bulk storage and thus reduce overall bus loading and thus increase system efficiency.

Figure 7:
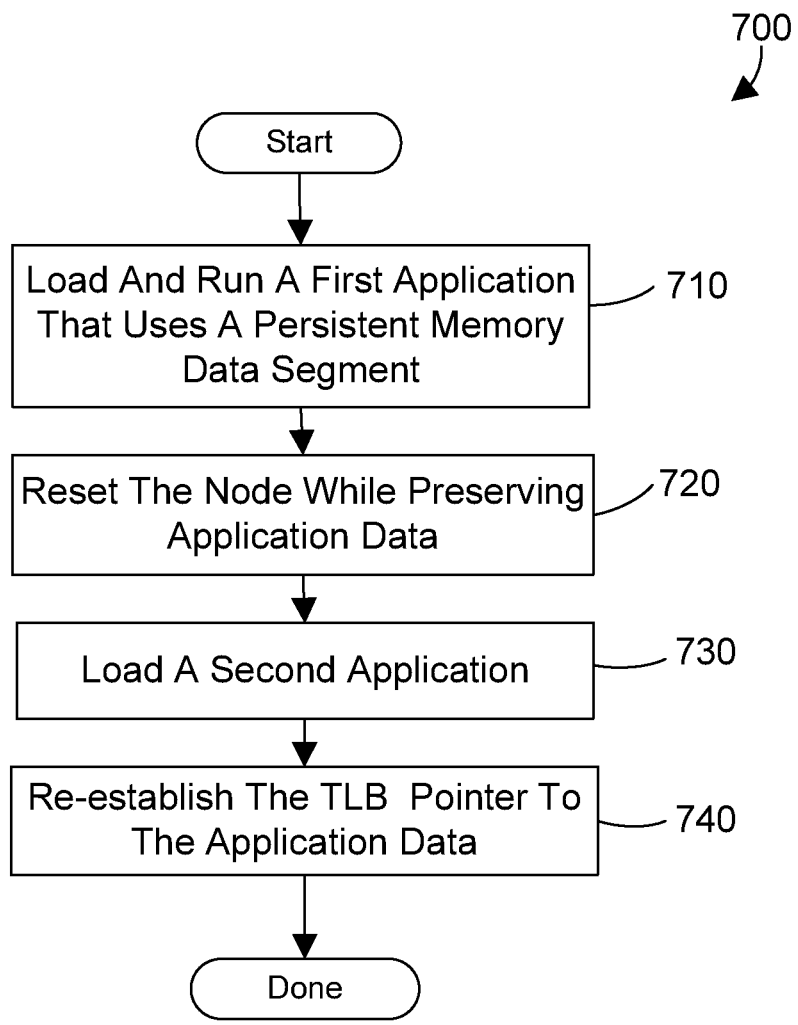
FIG. 7 is a flow diagram of a method for a PM Manager to manage persistent memory in a parallel computer system.

FIG. 7 shows a method 700 for utilizing persistent memory in a parallel computer system. The steps in method 700 are performed by the PM Manager in the service node 140 (FIG. 1). First, the PM Manager loads a first application program with a persistent memory data segment (step 710). Next, at the completion of the first application program, the node is reset while preserving the application data in the persistent memory (step 720). A second application program is loaded into the same node (step 730). The PM Manager then can re-establish the TLB pointer to the application data in the persistent memory so the data from the first application program can be reused without having to be reloaded (step 740). The method is then done.

An apparatus and method is described herein for creating and managing persistent memory in a parallel computer systems. The PM Manager creates pools of nodes with various sizes of persistent memory and manages the persistent memory so that subsequent applications can use the same data after initialization of the node to increase the efficiency of the parallel computer system.

One skilled in the art will appreciate that many variations are possible within the scope of the claims. Thus, while the disclosure has been particularly shown and described above, it will be understood by those skilled in the art that these and other changes in form and details may be made therein without departing from the spirit and scope of the claims.

The invention claimed is:

1. A parallel computer system comprising:
a plurality of fully functional compute nodes;
a persistent memory (PM) manager for creating and managing a plurality of pools of compute nodes each having the same size of persistent memory;
a first application that accesses data in a persistent memory through a translation look-aside buffer on a compute node of a plurality of compute nodes, wherein the translation look-aside buffer is part of a memory management unit; and
after a reset of the compute node that clears non-persistent memory on the node including the translation look-aside buffer and the first application, the PM manager re-establishing access to the data stored in the persistent memory by the first application for use by a second application loaded on the compute node by re-establishing pointers in the translation look-aside buffer.

2. The parallel computer system of claim 1 wherein the parallel computer system is a massively parallel computer system.

3. The parallel computer system of claim 1 wherein the PM Manager manages a pool of compute nodes with persistent memory containing system metadata on the compute nodes that is accessed by a first application and then accessed by a second application subsequently loaded on the compute nodes.

4. The parallel computer system of claim 1 wherein the PM Manager monitors an application's use of persistent memory to determine if the application has sufficient persistent memory and if the application uses the persistent memory efficiently.

5. The parallel computer system of claim 4 wherein the PM Manager migrates the application to a node with more persistent memory when the application needs more storage.

6. The parallel computer system of claim 4 wherein the PM Manager monitors the application by an application ID.

7. A computer-readable article of manufacture comprising software residing on a non-transitory computer recordable medium, the software comprising:
a persistent memory (PM) manager for creating and managing a plurality of pools of compute nodes on a parallel computer system, where each of the plurality of pools of compute nodes have the same size of persistent memory;

wherein the PM Manager manages a compute node of the plurality of compute nodes with persistent memory on the compute node containing data modified by a first application accessed through a translation look-aside buffer, wherein the translation look-aside buffer is part of a memory management unit; and wherein the PM manager re-establishes access to the data modified by the first application to be used by a second application subsequently loaded on the compute node after a reset of the compute node by re-establishing pointers in the translation look-aside buffer.

8. The article of manufacture of claim 7 wherein the PM Manager manages a pool of compute nodes with persistent memory containing system metadata on the compute nodes that is accessed by a first application and then accessed by a second application subsequently loaded on the compute nodes.

9. The article of manufacture of claim 7 wherein the PM Manager monitors an application's use of persistent memory to determine if the application has sufficient persistent memory and if the application uses the persistent memory efficiently.

10. The article of manufacture of claim 9 wherein the PM Manager migrates the application to a node with more persistent memory when the application needs more storage.

* * * * *